United States Patent [19]

Tull et al.

[11] Patent Number: 5,012,263

[45] Date of Patent: Apr. 30, 1991

[54] BELT DRIVE

[75] Inventors: Bernward Tull; Hans-Dieter Pusch, both of Aalen, Fed. Rep. of Germany

[73] Assignee: Carl-Zeiss-Stiftung, Heidenheim, Fed. Rep. of Germany

[21] Appl. No.: 539,240

[22] Filed: Jun. 18, 1990

[30] Foreign Application Priority Data

Jun. 21, 1989 [DE] Fed. Rep. of Germany ....... 3920182

[51] Int. Cl.$^5$ .......................... G03B 9/28; F16H 55/30
[52] U.S. Cl. ..................................... 354/241; 474/164
[58] Field of Search ......................... 354/241; 474/164

[56] References Cited

U.S. PATENT DOCUMENTS 3,232,198 2/1966 Van Breeman ..................... 354/241
3,346,158 10/1967 Hanson et al. ................... 474/164 X

FOREIGN PATENT DOCUMENTS 3418383 11/1984 Fed. Rep. of Germany .
8601570 3/1986 World Int. Prop. O. .

Primary Examiner—Michael L. Gellner
Attorney, Agent, or Firm—Walter Ottesen

[57] ABSTRACT

The invention is directed to a positively-guided belt drive wherein the drive of the belt by supporting surfaces is decoupled from the drive of the belt via projections. This decoupling is effected with the aid of ball bearings. In a belt drive of this kind, the forces acting on the inner side of the belt are greatly reduced. This leads to reduced wear and to a longer service life. The rate of malfunctions of focal plane shutters of photogrammetric cameras is significantly reduced by this belt drive.

10 Claims, 3 Drawing Sheets

BELT DRIVE

FIELD OF THE INVENTION

The invention relates to a belt drive having a belt pulley which has a plurality of radially extending projections for engaging corresponding perforations in the belt. The belt pulley also includes a supporting surface for supporting the belt.

BACKGROUND OF THE INVENTION

Belt drives of the kind described above are well known and provide a drive to be affected over a large spatial distance using simple means. The belt drives can also be used as a controlling drive because the belt provides for a definite coordination of the position of the driven parts to the parts of the drive shaft.

The belt pulley has a supporting surface for the belt laterally of the projections especially for thin perforated drive belts. This bearing surface is a part of the wheel which is driven or which performs the driving and has the above-mentioned projections.

Published German patent application DE 34 18 383 discloses a belt pulley for such a belt drive. Forms and dimensions of the projections and of the supporting surface are given which are intended to act advantageously with respect to the running characteristics of the drive. Projections having round lateral boundary faces are especially preferred.

Published international patent application with International Publication Number WO 86104570 discloses possibilities as to how a second belt pulley can be advantageously configured. The second belt pulley is driven with such a belt drive and has a larger diameter than the driving pulley.

In the known belt drives of this kind, the belt is driven simultaneously by two mechanisms. The first driving mechanism takes place by means of the engagement of the projections of the belt pulley in the cutouts or perforations of the belt. This drive mechanism constitutes a positive belt drive. The friction between the supporting surface and the belt constitutes a second competing drive mechanism. Because of expansion slippage, the second drive mechanism drives the belt faster via the supporting surface than the positive first drive mechanism.

High stresses occur at the perforations in the belt as a consequence of these two competing drive mechanisms having different transport velocities. This stress damages the perforations on the side opposite to the direction of movement of the belt and can lead to a destruction of the belt. This problem occurs, for example, in photogrammetric apparatus. There, thin perforated steel bands drive the focal plane shutter of the camera and damage to these belts can lead to a premature malfunction of the apparatus.

SUMMARY OF THE INVENTION

In view of the above, it is an object of the invention to provide a belt drive of the kind described above wherein the stress imparted to the drive belt is significantly reduced and the service life of the belt is correspondingly extended.

The belt drive of the invention includes: a belt having a plurality of perforations formed therein; a belt pulley defining a rotational axis and having a plurality of radially extending projections for engaging the perforations; the belt having an inner surface facing toward the rotational axis; supporting surface means associated with the belt pulley for receiving the inner surface of the belt thereagainst; the sprockets defining a first drive means for driving the belt; the supporting surface means defining a second drive means for acting on the belt; and, decoupling means for rotationally decoupling the first drive means and the second drive means from each other.

The decoupling of the two drive mechanisms causes the belt to be driven by only a single drive mechanism. The decoupling reduces the forces occurring within the belt and thereby significantly reduces the wear. For the reduction of these forces, it is unessential as to which drive mechanism is rendered ineffective by the decoupling.

The decoupling of the two drive mechanisms can, for example, occur in that the supporting surface is rotatably journalled about the drive axis of the belt pulley on that part of the belt pulley which has the projections.

In order to prevent any static friction between the belt and the part having the projections, the belt should nowhere lie against this part. For this reason, the diameter of the parts carrying the bearing or supporting surface is greater than the diameter of the part having the projections measured between two projections. A simple and effective decoupling is provided by a ball bearing in the form of a rotational bearing.

If the instantaneous position of the driven parts of the belt drive is to be known at every point in time, then it is advantageous that the belt be driven by the projections of the belt pulley. The position of the driven parts can then be determined via a position transducer coupled to the belt pulley. In this embodiment, a shaft acts to drive the belt pulley as well as to determine the position of the driven parts. The drive of the belt pulley can be achieved by means of a motor having an integrated position transducer.

In this embodiment, the belt drives the supporting surface upon which the belt is placed. For reducing the forces acting during the acceleration phase of the drive on the belt, the moment of inertia of the parts which are driven by the belt should be as low as possible. For this reason, the outer race of the ball bearing is itself the supporting surface.

The projections of the drive pulley have a rectangular outline when viewed in plan to prevent large local stresses in the drive belt. The contact surfaces between the projections and the drive belt are thereby increased.

The engagement of the projections of the drive pulley in the cutouts of the belt is intended to be free of friction and take place easily. The same is the case when the projections are withdrawn from the perforations. This can be achieved by providing that the projections have circular arc-shaped teeth, for example.

The belt drive according to the invention can also be used when the focal plane shutter of a photogrammetric camera is to be driven. This application requires that the drive provide a high velocity to make short exposure times possible. If the frame speed is to be freely selectable, then the focal plane shutter must furthermore function in a start/stop operation. The drive must then be rapidly accelerated. Furthermore, in this type of apparatus, the position of the shutter slit is measured during the exposure and the film is correspondingly adjusted in order to compensate for image motion occurring during a movement of the photogrammetric camera. All these requirements imposed on the belt of such a focal plane shutter are fulfilled in the belt drive according to the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
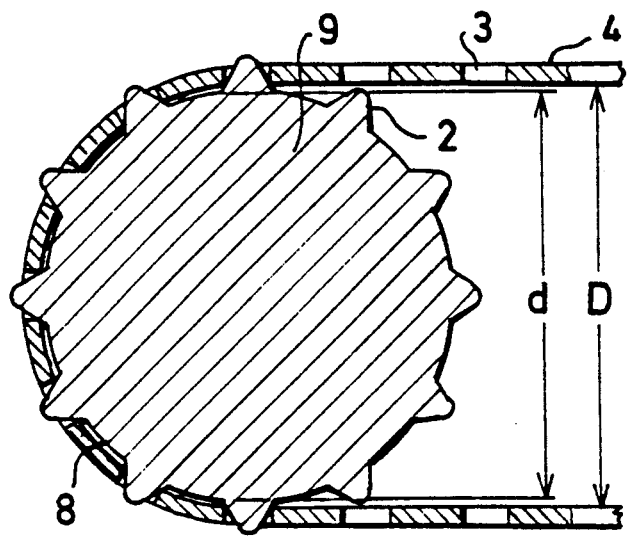
FIG. 1 is a section view taken through the belt pulley and the belt drive of a first embodiment of the belt drive of the invention with the section view being taken in a plane along line I—I of FIG. 2 in a plane perpendicular to the drive axis.
Figure 2:
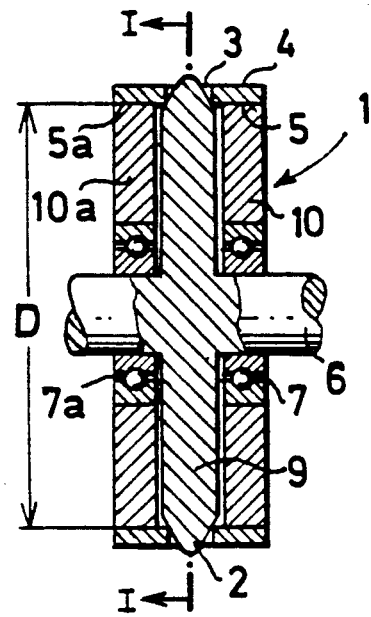
FIG. 2 is a section view taken through the drive pulley and the drive belt of FIG. 1 in a plane containing the drive axis of the drive pulley.

As shown in FIGS. 1 and 2, the drive pulley 1 comprises a toothed disc 9 having projections 2. The projections 2 have a round outline when viewed in plan. The toothed disc 9 is driven via the shaft 6. The drive belt 4 lies on a supporting surface 5 laterally of the perforations 3. In this embodiment, the drive disc 1 has a second supporting surface 5a which is disposed on the other side of the projections 2. The belt drive 4 of FIG. 3 has circular perforations 3 in correspondence to the outline of the projections 2 of the toothed disc 9. The engagement of the projections 2 in the perforations 3 effects a positive drive of the drive belt 4.

Figure 3:
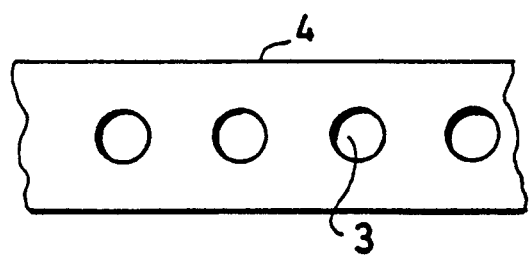
FIG. 3 is a plan view of a segment of the drive belt of FIG. 1.

In contrast to known drive discs wherein the drive of the belt is affected via two competing drive mechanisms, in the embodiment of FIGS. 1 to 3 one of the two drive mechanisms is rendered ineffective. This condition is present because the ring-shaped parts (10, 10a), which carry the supporting surfaces (5, 5a) for the belt 4, are rotatably journalled with the aid of two ball bearings (7, 7a) about the shaft 6 so as to be freely rotatable and are therefore decoupled from the rotational movement of the shaft 6 and the toothed disc 9.

If the shaft 6 acts as a drive shaft, then the drive of the belt 4 is performed exclusively by the engagement of the projections 2 in the perforations 3. A position transducer for measuring the position of the driven parts can therefore be directly mounted on the drive shaft 6 or be directly integrated with the motor which drives the belt drive.

The drive of the belt takes place here with only a single drive mechanism in this embodiment of the invention. For this reason, the forces acting on the inside of the belt are significantly reduced compared to the known belt drives and the service life of the belt is correspondingly increased.

Attention is called to the fact that the drive belt 4 nowhere lies on a surface which is rigidly connected to the shaft 6 or the projections 2. For this reason, the diameter (d) of the toothed disc 9, measured between the projections 2, is less than the outer diameter (D) of the parts (10, 10a) carrying the supporting surfaces (5, 5a). Small hollow spaces 8 are then formed between the drive belt 4 and the drive disc 1 as shown in FIG. 1.

Figure 4:
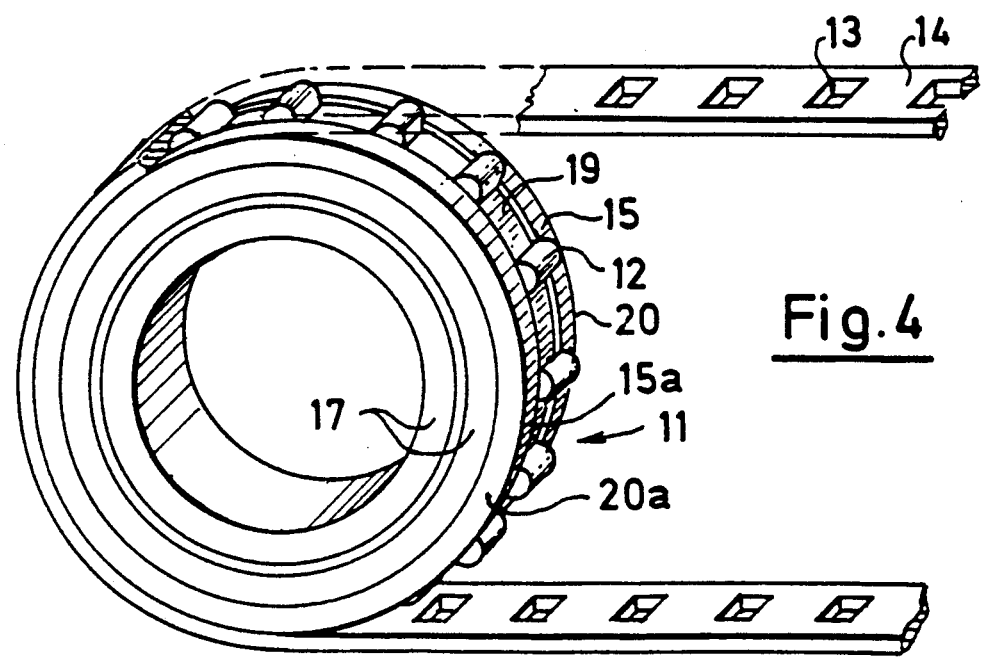
FIG. 4 is a perspective view of the drive pulley and the drive belt according to a second embodiment of the invention wherein the projections of the drive pulley have a rectangular outline when viewed in plan.

The drive force should be transmitted to the drive belt 4 on the largest possible surface of the projections 2 of the toothed disc 9 in order that local stresses in the drive belt 4 are held as low as possible for predetermined operating conditions. Accordingly, the projections 12 in the embodiment of FIG. 4 have a rectangular outline when viewed in plan. The drive belt 14 is correspondingly provided with rectangular perforations 13. In the embodiment of FIG. 4 all the other things are depicted by the same reference numerals as in FIGS. 1 to 3 to which the number ten is added.

Figure 5:
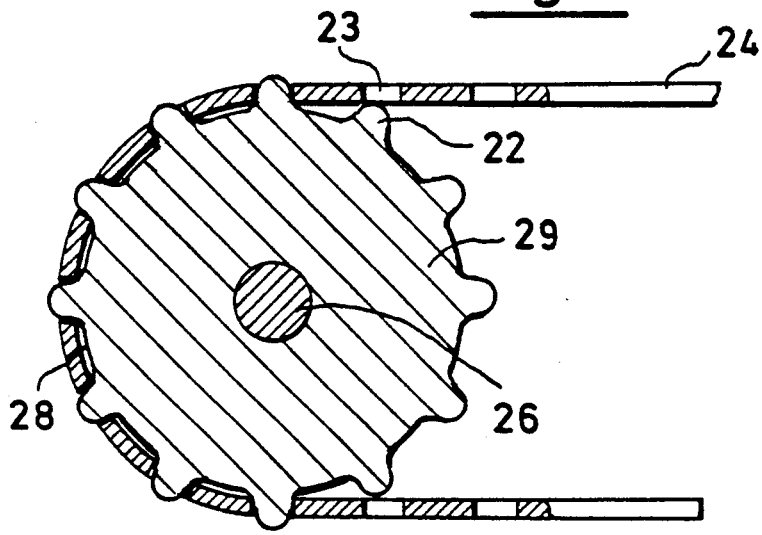
FIG. 5 is a section view taken through the drive pulley and the drive belt according to a further embodiment of the drive belt according to the invention taken along a plane perpendicular to the rotational axis along line V—V of FIG. 6.
Figure 6:
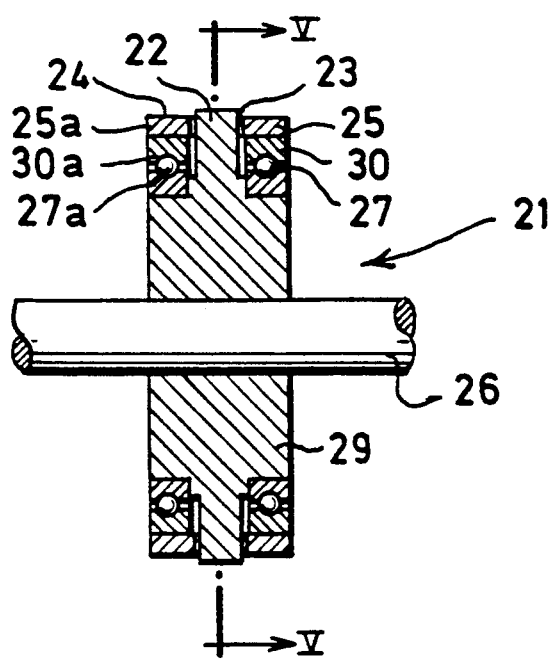
FIG. 6 is a section view taken through the drive pulley and the drive belt of FIG. 5 in a plane containing the rotational axis of the drive pulley; and, FIG. 7 is a perspective view of a focal plane shutter of a photogrammetric camera having a belt drive according to the embodiment of FIGS. 5 and 6.
Figure 5A:
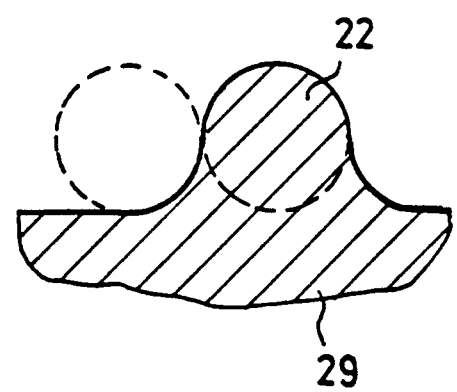
FIG. 5a is an enlarged view of a tooth of the drive pulley of FIG. 5 showing its circular-arc shaped configuration.

In the embodiment of FIGS. 5 and 6, projections 22 of the drive disc 21 are configured as circular-arc teeth. One of these teeth is shown enlarged in FIG. 5a and these teeth ensure that the projections 22 engage and disengage the perforations 23 easily and with minimal friction.

The drive belt 24 is itself driven by toothed disc 29. Since the drive belt 24 drives its own supporting surfaces (25, 25a) on the drive wheel 21 via friction, the forces transmitted from the drive belt during the acceleration phase of the drive are that much greater in accordance with the moment of inertia associated with the supporting surfaces (25, 25a). This moment of inertia can be held small in that the outer races (30, 30a) of the ball bearings (27, 27a) itself define the supporting surfaces (25, 25a) for the drive belt 24 as shown in FIG. 6.

A possible application for the belt drive of the invention is the focal plane shutter of a photogrammetric camera.

Such a focal plane shutter comprises four belts arranged parallel to each other. These belts can be configured in accordance with the embodiment of FIGS. 5 and 6 and have a common drive.

Figure 7:
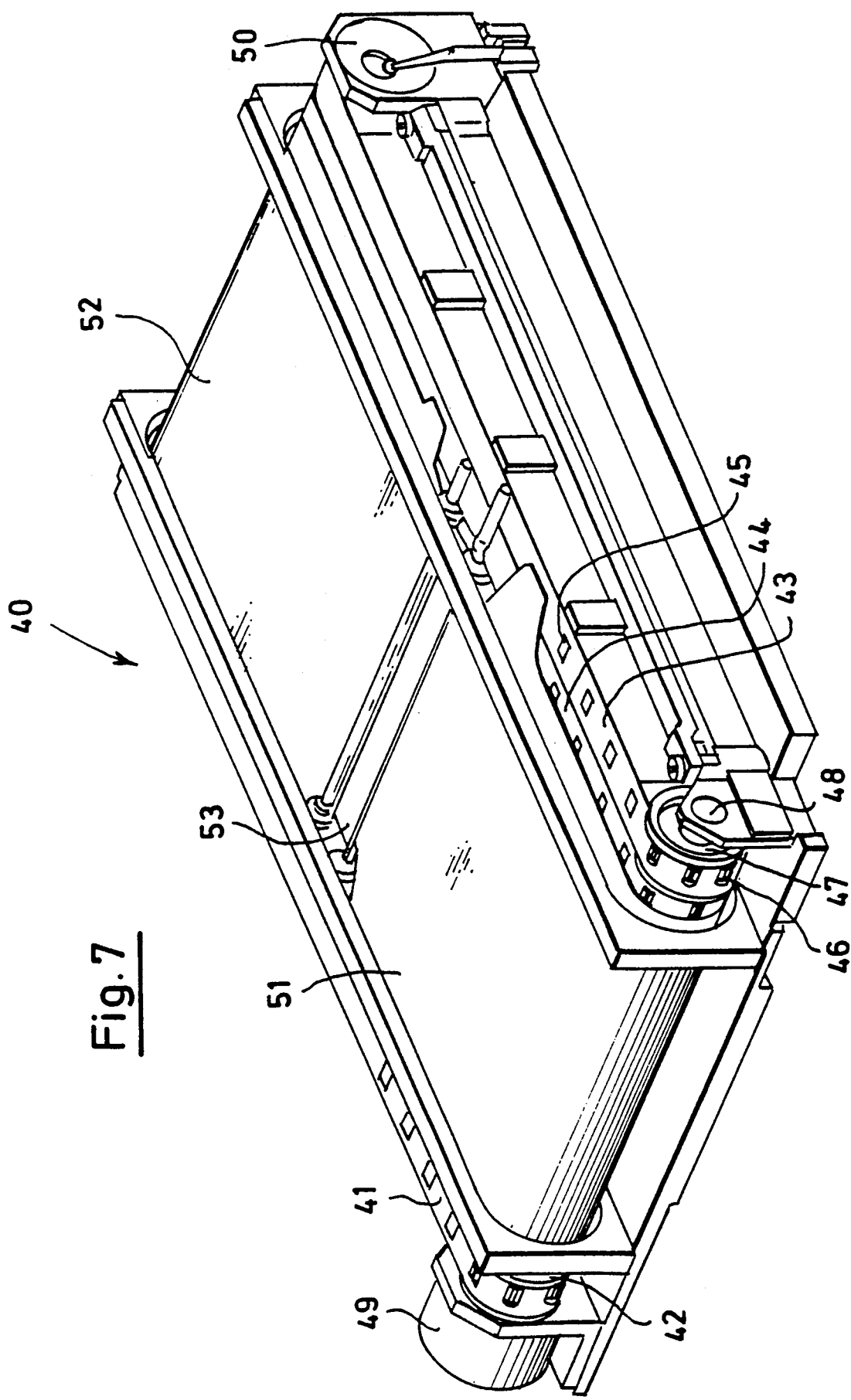

FIG. 7 shows such a focal plane shutter 40. The four drive belts (41, 42, 43, 44) have rectangular perforations 45 in which the circular-arc shaped teeth 46 of the drive discs 47 engage. The four drive discs are driven by a motor 49 in pairs via two coaxial drive shafts. The inner one of the two coaxial drive shafts is identified by reference numeral 48. The belts (41, 42, 43, 44) lie laterally of the teeth 46 on ball bearings. The belts are made of stainless steel and have a thickness of 0.06 mm. The belts (41, 42, 43, 44) are placed over a cylindrical shaft 50 and this cylindrical shaft 50 functions as the driven belt pulley.

Two blinds (51, 52) are attached to the drive belts. The shutter blind 51 is attached to the two outer drive belts (41, 43) and the shutter blind 52 is connected to the two inner drive belts (42, 44). The intermediate space between the shutter blinds (51, 52) defines the slit 53 of the shutter.

The two coaxial drive shafts are coupled by a transmission not shown in greater detail. This transmission permits the outer belts (41, 43) to move relative to the inner belts (42, 44). In this way, the width of the slit 53 can be varied.

The slit 53 is transported over the photographic film for exposure. For this purpose, the four drive belts (41, 42, 43, 44) are driven with the same constant speed.

At the same time, and with the aid of a position transducer coupled with the drive shaft 48, the instantaneous slit position is detected and the photographic film is adjusted so that the image movement occurring with the movement of the camera is compensated. The drive belts (41, 42, 43, 44) must be positively driven so that the slit position can be detected from the position of the drive shaft 48. The circular-arc shaped teeth 46 of the drive pulley 47 and the perforations 45 of the drive belts (41, 42, 43, 44) serve this purpose.

During the exposure, the slit 53 has a typical speed of 5 m per second.

The focal plane shutter functions in a start/stop operation so that the frame speed is freely selectable. Accordingly, the slit must be accelerated to a terminal velocity along a distance corresponding to approximately one quarter of its cycle path.

In a focal plane shutter configured as shown in the embodiment of FIG. 7, the stresses within the drive belts (41, 42, 43, 44) are significantly reduced with respect to the state of the art. The wear is also correspondingly less. Especially tearing of the drive belts (41, 42, 43, 44) is substantially eliminated.

The new focal plane shutter makes possible a considerably longer service life of such photogrammetric cameras since the operational disturbances in the camera were previously often caused by wear or tearing of the drive belts of the focal plane shutter.

In the embodiments described above, the drive disc was always shown as consisting of two parts rotatable independently of each other. This is however not absolutely necessary for an effective decoupling of the two competing drive mechanisms. It is also possible, for example, that the drive pulley be one part and that sliding means be interposed between the bearing surface and the drive belt. The belt would then likewise only be driven by a single drive mechanism since such a slide means reduces the friction.

It is understood that the foregoing description is that of the preferred embodiments of the invention and that various changes and modifications may be made thereto without departing from the spirit and scope of the invention as defined in the appended claims.

What is claimed is:

1. A belt drive comprising:
   a belt having a plurality of perforations formed therein;
   a belt pulley defining a rotational axis and having a plurality of radially extending projections for engaging said perforations;
   said belt having an inner surface facing toward said rotational axis;
   supporting surface means associated with said belt pulley for receiving said inner surface of said belt thereagainst;
   said projections defining a first drive means for driving said belt;
   said supporting surface means defining a second drive means for acting on said belt; and,
   decoupling means for rotationally decoupling said first drive means and said second drive means from each other.

2. A belt drive comprising:
   a belt having a plurality of perforations formed therein;
   a drive pulley having a plurality of radially extending projections formed thereon for engaging said perforations;
   drive means for rotatively driving said drive pulley so as to enable said drive pulley to impart movement to said belt at said perforations;
   said belt having an inside surface facing toward said drive pulley; and,
   support and decoupling means for supporting said belt at said inside surface laterally of said projections while simultaneously decoupling the support at said inside surface from said drive means.

3. The belt drive of claim 2, said support and decoupling means including a member defining a supporting surface for supporting said belt at said inside surface thereof; and, said member being mounted on said drive means so as to be rotatable independently of said drive pulley.

4. The belt drive of claim 3, said support and decoupling means further including ball bearing means interposed between said drive means and said supporting surface.

5. The belt drive of claim 2, said support and decoupling means including two separate annular members disposed on respective sides of said drive pulley; said annular drive members defining respective supporting surfaces for supporting said belt at said inside surface thereof and being mounted on said drive means so as to be rotatable independently of said drive pulley; each of said annular members having a first diameter (D) defined by the supporting surface thereof; said drive pulley having a second diameter (d) measured between said projections; and, said first diameter (D) being greater than said second diameter (d).

6. The belt drive of claim 5, said support and decoupling means further including first and second ball bearing means interposed between said drive means and the supporting surfaces of corresponding ones of said annular members.

7. The belt drive of claim 2, said drive pulley having two peripheral surfaces on respective sides of said projections; said support and decoupling means including first and second roller bearing units; each of said roller bearing units having an inner race and an outer race; and, said roller bearing units being mounted on respective ones of said peripheral surfaces so as to cause the inner race to be seated on the peripheral surface and so as to cause the outer race to define the supporting surface for supporting the belt at the inside surface thereof.

8. The belt drive of claim 2, said projections having a rectangular outline when viewed in plan.

9. The belt drive of claim 8, said projections having a circular-arc shape when viewed in side elevation.

10. A focal plane shutter for a photogrammetric camera, the shutter comprising:
    a frame;
    slit means movably mounted in said frame and defining a slit;
    belt drive means for driving said slit means to move said slit, said belt drive including:
    a belt having a plurality of perforations formed therein;
    a drive pulley having a plurality of radially extending projections formed thereon for engaging said perforations;

drive means for rotatively driving said drive pulley so as to enable said drive pulley to impart movement to said belt at said perforations;

said belt having an inside surface facing toward said drive pulley;

a member mounted on said drive means and defining a supporting surface means for supporting said belt at said inside surface laterally of said projections;

rotating decoupling means interposed between said supporting surface means and said drive means so as to permit said supporting surface means to rotate independently of said drive pulley; and, said member having a first diameter defined by said supporting surface means; said pulley having a second diameter measured between said projections; and, said first diameter being greater than said second diameter.

* * * * *